United States Patent

[11] 3,571,905

| [72] | Inventors | Marion R. Calton<br>East Peoria;<br>Carl D. Weiss, Peoria, Ill. |
|---|---|---|
| [21] | Appl. No. | 747,779 |
| [22] | Filed | July 19, 1968 |
| [45] | Patented | Mar. 23, 1971 |
| [73] | Assignee | Caterpillar Tractor Co.<br>Peoria, Ill. |

[54] FRICTION WELDING SINTERED MATERIALS
4 Claims, 3 Drawing Figs.

[52] U.S. Cl...................................................... 29/470.3,
156/73, 228/2
[51] Int. Cl...................................................... B23k 27/00
[50] Field of Search........................................... 29/470.3;
228/2; 156/73

*Primary Examiner*—John F. Campbell
*Assistant Examiner*—Robert J. Craig
*Attorney*—Fryer, Tjensvold, Feix, Phillips & Lempio ABSTRACT: Friction welding porous sintered materials, such as sintered steel, sintered copper and sintered alloys thereof to each other and to other metals including process parameters for the welding of these materials.

SINTERED SAE 1080 STEEL

WELD LINE

SAE 1040 STEEL

3,571,905

FRICTION WELDING SINTERED MATERIALS

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature, whereupon the relative rotation subsides and a bond is formed between the workpieces.

The invention is particularly directed to the joining of porous sintered materials to each other and to other materials by the friction welding process. The invention is more specifically directed to the friction welding of various compositions of sintered steel and sintered copper, and includes the welding parameters which are used to produce good welds with these compositions.

It is also to be understood that the invention is applicable to the inertia friction welding process as described in U.S. Pat. No. 3,273,233 and as set forth below.

In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to the engagement of the parts at the interface. The stored energy is discharged into the interface through frictional heating and plastic working developed at the interface as the rubbing contact slows the rotating weights and the bonding cycle is concluded.

This invention is principally directed toward powder metallurgy materials which may be classified in the "as sintered" or "as sintered and heat treated" condition, and containing considerable porosity. This class of materials, which principally includes sintered iron, steel and copper insofar as most commercial applications are concerned, is considered extremely difficult, if not impossible, to weld by conventional welding methods. In fact, these sintered materials are generally considered not weldable because of their porosity, and consequently very little information is available with regard to attempts at conventional welding of porous sintered materials.

The problem involved in conventional welding of these sintered materials results from gas and moisture entrapped in the pores of the material. This entrapped gas and moisture makes it very difficult to get an acceptable weld by conventional welding methods and attempts thereat invariably result in 4 quality welds due to cracking and gas pockets. If conventional welding of these porous sintered materials is to be at all successful, a thorough heating and degreasing operation to eliminate the oil or water and gas entrapped in the pores of the material would appear to be a necessary preliminary operation prior to the actual welding of the materials. Even with a thorough degreasing and dehydration operation prior to welding, it is very doubtful whether conventional fusion welding would produce an acceptable bond because of the porosity of the sintered material.

Accordingly, it is the principal object of the present invention to friction weld the aforementioned sintered materials wherein the interface of the weld zone is compacted to eliminate voids and a high density, hot worked metallic structure is produced which is substantially nonporous rather than a technically sintered composition.

It is a further object of the invention to provide parameters for the friction welding of these sintered materials, which parameters result in the compacting of the material to eliminate voids at the weld zone and produce a bond comprised of a high density, hot worked metallic structure.

Other objects and advantages of the present invention will be apparent from the following description and claims and are illustrated in the accompanying drawings which, by way of illustration, show preferred embodiments of the present invention and the principles thereof and what is now considered to be the best mode contemplated for applying these principles. It is recognized that other embodiments of the invention embodying the same or equivalent principles may be used, and structural changes may be made as desired by those skilled in the art without departing from the present invention and the purview of the appended claims.

DESCRIPTION OF THE PREFERRED EMBODIMENT

Figure 1:
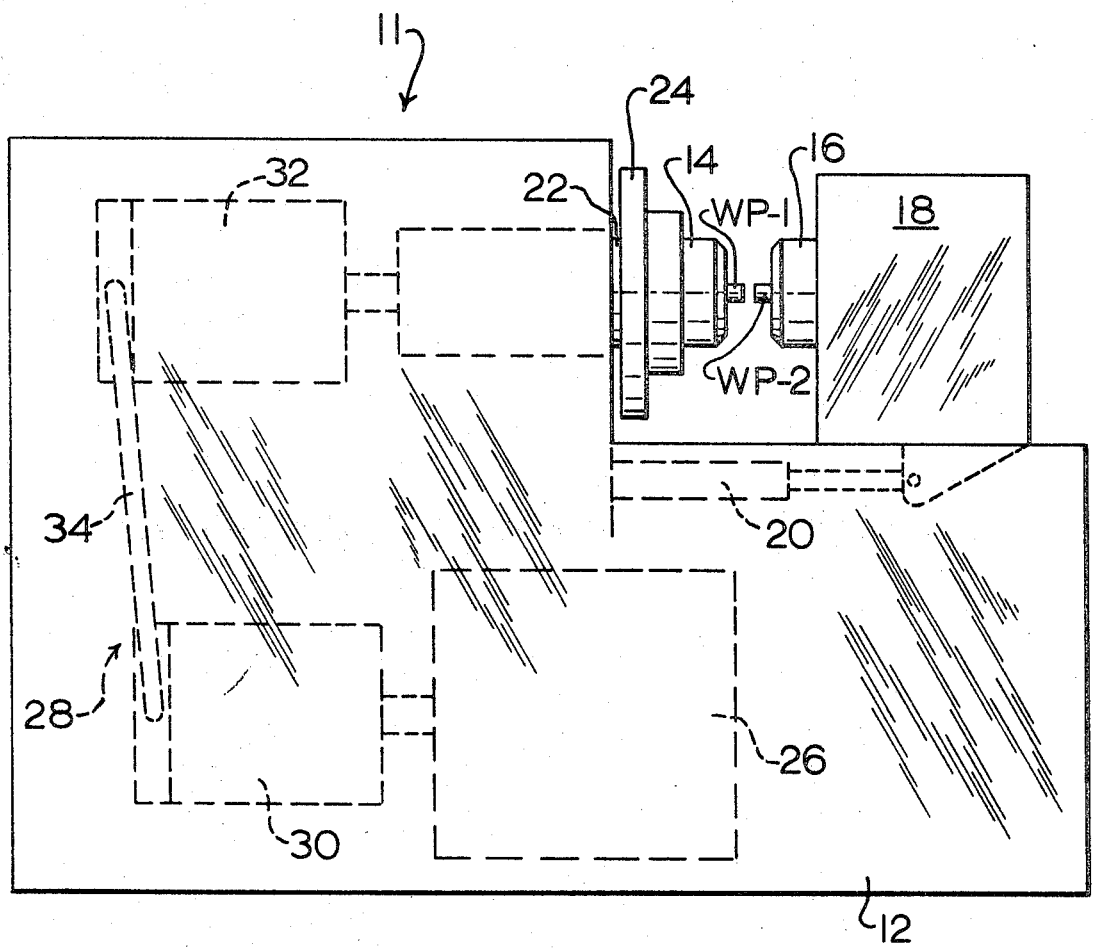
FIG. 1 is a side elevation illustrating one embodiment of a friction welding machine which may be used to practice the method of the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP-1 and WP-2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP-1 and WP-2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Pat. No. 3,273,233 and as described in further detail below.

A welding operation to join a first workpiece, such as sintered steel or sintered copper, to a second workpiece such as another porous sintered material or any other metal such as steel, for example, can be performed by operating the machine in the following general manner. One of the weld pieces WP-1 is firmly clamped in the rotatable chuck 14 located on the spindle 22. The other weld piece WP-2 is firmly clamped in the nonrotatable chuck 16 which is located on the tailstock portion 18 of the machine. Upon actuation of the motor 26, the flywheel and workpiece WP-1 are accelerated to a predetermined velocity.

Once the predetermined velocity has been obtained, the motor 26 is disconnected or shutdown and the ram mechanism 20 is actuated to move tailstock portion 18 and workpiece WP-2 into contact with the rapidly rotating workpiece WP-1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed.

To illustrate the manner in which the friction welding process, and particularly the inertia friction welding process, has been utilized to join porous sintered materials both to themselves and to other metals an exemplary weld will now be discussed with respect to the remaining FIGS. It is to be understood, however, that the following exemplary weld is for the purpose of illustration and the invention is not to be regarded as limited to any of the specific materials recited with respect thereto.

Figure 2:
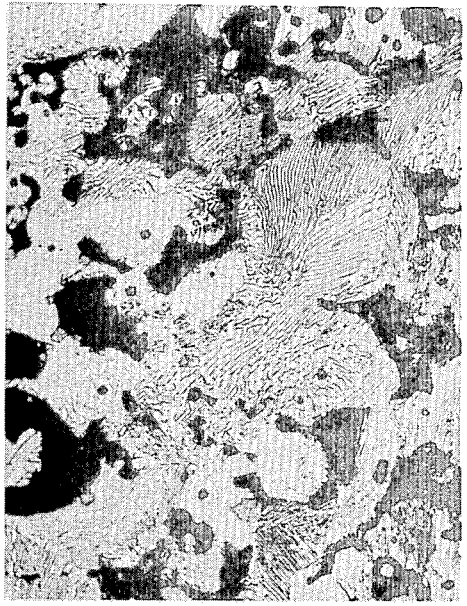
FIG. 2 is a photomicrograph illustrating the microstructure of a specimen of sintered SAE 1,080 steel; and, FIG. 3 is a photomicrograph illustrating a specimen of sintered SAE 1,080 steel which has been bonded to a specimen of SAE 1,040 steel by the friction welding method of the present invention.

FIG. 2 is a photomicrograph illustrating the microstructure of an unwelded specimen of a base metal comprised of sintered SAE 1,080 steel material. The specimen illustrated in FIG. 2 has been magnified 500 times and etched with a 1 percent solution of nital (99 percent alcohol and 1 percent concentrated nitric acid). It should be observed that the specimen of sintered material illustrated in FIG. 2 is quite porous having a large percentage of voids indicated by the dark spots and lines. The amount of porosity in this material has been estimated to be 30 percent.

Figure 3:
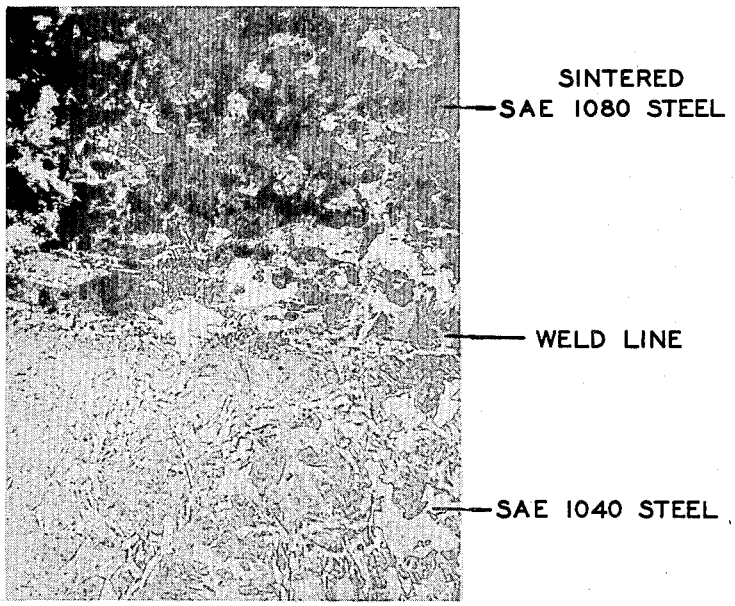

FIG. 3 is a photomicrograph illustrating a friction weld by the process of the present invention between the porous sintered SAE 1,080 steel of FIG. 2 and a workpiece of SAE 1,040 steel. The photomicrograph of FIG. 3 has also been magnified 500 times and etched with a 1 percent solution of nital. The sintered material SAE 1,080 steel material is at the top of the photomicrograph and the SAE 1,040 steel is on the bottom with the weld zone approximately in the center as indicated.

Again it may be observed that the sintered SAE 1,080 steel material shown at the top of the photomicrograph has a large number of voids indicated by the dark spots and lines. It should be noted that these voids decrease in number as the weld zone is approached and that the voids completely disappear at the weld line. Because of the high density at the weld line the weld is at least as strong and probably stronger than the base material (sintered SAE 1,080 steel).

By utilizing the proper friction welding parameters for the welding of these porous sintered materials as the workpieces are relatively rotated and brought into engagement, a high heat condition is created at the interface of the workpieces which drives off gas and vapors contained in the porous sintered material. Thus, any oil or water which is contained in the pores of the sintered material is literally squeezed out of the interface zone so that at the interface a compacted, high density, hot worked metallic structure is developed rather than a technically sintered composition.

From the work done involving various samples and test programs, parameter ranges have been established for the friction welding of porous sintered materials to each other and to other metals. These parameter ranges are:

Surface Velocity ———— 500— 4,000 feet per minute.
Axial Load or Pressure —— 5,000—30,000 pounds per square inch.
Input energy ———— 15,000—50,000 foot-pounds per square inch.

For sintered steel materials the parameter ranges for producing good friction welds are:

Surface Velocity ———— 500—1,500 feet per minute.
Axial Load or Pressure —— 15,000—30,000 pounds per square inch.
Input Energy ———— 20,000—50,000 foot-pounds per square inch.

For sintered copper materials the parameter ranges for producing good friction welds are:

Surface Velocity ———— 1,800—4,000 feet per minute.
Axial Load or Pressure —— 5,000—30,000 pounds per square inch.
Input Energy ———— 15,000—50,000 foot-pounds per square inch.

The parameters set forth above are the values which are considered necessary to produce acceptable or good welds when friction welding these materials. "Acceptable" in this sense means complete bonding of the entire interface such that the weld zone is formed into a compacted, high density, hot worked structure which is free of voids and substantially nonporous.

Sintered materials which may be friction welded according to the present invention include sintered SAE 1,080 steel material, sintered SAE 4,340 steel material, sintered SAE 1024 steel material, sintered copper and copper alloys (such as sintered materials having a copper-tin base or iron-copper base) and many other well known sintered materials.

In addition, friction welds have been made with porous sintered materials of various compositions which were saturated with cooling fluid. These welds were quite satisfactory when performed under the parameter conditions set out above and did not require any thorough degreasing operation or similar preliminary procedures to eliminate the oil or water entrapped in the pores of the material since under the process of the present invention such oil and water is driven off during the welding operation.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of friction welding porous sintered workpieces to each other or to other metals comprising the steps of effecting relative rotation of the workpieces at speeds of from approximately 500 to 4,000 surface feet per minute, forcing the workpieces into frictional engagement at their common interface under a predetermined axially applied pressure of from approximately 5,000 to 30,000 pounds per square inch; effecting an energy transfer at the interface in a range of from approximately 15,000 to 50,000 foot-pounds per square inch, which concentrates heat at the interface until a bond is formed and all the input energy is expended; and wherein the weld zone bond is formed into a compacted high density, hot worked metallic structure which is free of voids and substantially nonporous.

2. A method of friction welding porous sintered steel workpieces to each other or to other metals comprising the steps of effecting relative rotation of the workpieces at speeds of from approximately 500 to 1,500 surface feed per minute, forcing the workpieces into frictional engagement at their common interface under a predetermined axially applied pressure of from approximately 15,000 to 30,000 pounds per square inch; effecting an energy transfer at the interface in a range of from approximately 20,000 to 50,000 foot-pounds per square inch, which concentrates heat at the interface until a bond is formed and all the input energy is expended; and wherein the weld zone bond is formed into a compacted, high density, hot worked metallic structure which is free of voids and substantially nonporous.

3. A method of friction welding porous sintered copper workpieces to each other or to other metals comprising the steps of effecting relative rotation of the workpieces at speeds of from approximately 1,800 to 4,000 surface feet per minute, forcing the workpieces into frictional engagement at their common interface under a predetermined axially applied pressure of from approximately 5,000 to 30,000 pounds per square inch; and effecting an energy transfer at the interface in a range of from approximately 15,000 to 50,000 foot-pounds per square inch, which concentrates heat at the interface until a bond is formed and all the input energy is expended; and wherein the weld zone bond is formed into a compacted, high density, hot worked metallic structure which is free of voids and substantially nonporous.

4. A method as set forth in any one of claim 1, 2 and 3 wherein said workpieces are friction welded to each other by the inertia friction welding process and wherein one of said workpieces is operatively associated with a rotating mass, which mass stores the requisite amount of input energy to be released at the weld interface.